(12) United States Patent
Li et al.

(10) Patent No.: US 10,554,121 B2
(45) Date of Patent: Feb. 4, 2020

(54) THERMAL DE-RATING FOR A MULTI-MODE SWITCHING POWER CONVERTER

(71) Applicant: DIALOG SEMICONDUCTOR INC., Campbell, CA (US)

(72) Inventors: Yong Li, Campbell, CA (US); Scott Brown, Campbell, CA (US); Mengfei Liu, Campbell, CA (US); Yimin Chen, Campbell, CA (US)

(73) Assignee: DIALOG SEMICONDUCTOR INC., Campbell, CA (US)

( * ) Notice: Subject to any disclaimer, the term of this patent is extended or adjusted under 35 U.S.C. 154(b) by 0 days.

(21) Appl. No.: 16/421,091

(22) Filed: May 23, 2019

(65) Prior Publication Data

US 2019/0280589 A1 Sep. 12, 2019

Related U.S. Application Data

(63) Continuation of application No. PCT/US2018/017875, filed on Feb. 12, 2018.

(60) Provisional application No. 62/457,771, filed on Feb. 10, 2017.

(51) Int. Cl.
*H02J 7/00* (2006.01)
*H02M 1/32* (2007.01)
*H02M 3/335* (2006.01)
*H02M 1/08* (2006.01)

(52) U.S. Cl.
CPC .............. *H02M 1/32* (2013.01); *H02J 7/0052* (2013.01); *H02M 1/08* (2013.01); *H02M 3/33592* (2013.01); *H02J 2007/0062* (2013.01); *H02M 2001/327* (2013.01)

(58) Field of Classification Search
USPC ........................................................ 320/140
See application file for complete search history.

(56) References Cited

U.S. PATENT DOCUMENTS

| 2006/0082346 A1 | 4/2006 | Nagasawa | |
| 2016/0116511 A1* | 4/2016 | Yang | G01R 19/0092 |
| | | | 324/105 |

FOREIGN PATENT DOCUMENTS

| CN | 105490355 | 4/2016 |
| JP | 2006-230080 | 8/2006 |
| JP | 2011-114955 | 6/2011 |
| KR | 10-2010-0000347 | 1/2010 |

OTHER PUBLICATIONS

PCT Written Opinion of the International Preliminary Examining Authority, PCT Application No. 2018/017875, dated Apr. 22, 2019, 4 pages.

* cited by examiner

*Primary Examiner* — Samuel Berhanu
(74) *Attorney, Agent, or Firm* — Haynes and Boone, LLP

(57) ABSTRACT

A switching power converter is disclosed that communicates a thermal alarm to a mobile device over a data channel in a data cable for charging the mobile device.

18 Claims, 4 Drawing Sheets

THERMAL DE-RATING FOR A MULTI-MODE SWITCHING POWER CONVERTER

CROSS-REFERENCE TO RELATED APPLICATIONS

This application is a continuation of International Application No. PCT/US2018/017875, filed Feb. 12, 2018, which claims the benefit of U.S. Provisional Application No. 62/457,771, filed Feb. 10, 2017, each of which is hereby incorporated by reference in its entirety.

FIELD OF THE DISCLOSURE

This disclosure relates generally to switching power converters and, more particularly, to providing thermal de-rating for a multi-mode switching power converter.

BACKGROUND

A switching power converter controller will typically monitor its temperature so that it may lower the switching power converter's output voltage and/or output current if the temperature exceeds a thermal limit. Since the switching power converter is then operating at less than its rated maximum capability, the lowering of the output voltage or the output current (or both) is referred to as thermal de-rating. Generally, existing solutions for thermal de-rating (or thermal scaling) for switching power converters cover only single mode power converters, for example, power converters operating with a fixed output voltage and in constant voltage mode (CV mode). In this case, the power limit (maximum output power for the power converter) is reduced by reducing the output voltage when an over temperature condition is detected in which the state of the power converter exceeds a safe value. Such a thermal de-rating is static and thus independent to the operating conditions of the load device that is being charged.

But a purely CV mode thermal de-rating fails to satisfy the needs of modern power multi-mode adapters or "travel adapters" (TA) that directly charge a portable device through a data cable such as a USB cable or the Apple lightning cable. In general, charging of portable devices over such data cables is subject to a default output voltage level (e.g., 5 V). But in a multi-mode power adapter, there are additional charging modes in which the output voltage carried by the data cable is increased above the default level (e.g., one mode would use 9 V, another mode 12 V, and so on). In addition, note that the direct charging of a portable device battery such as a lithium battery occurs over several phases of constant voltage (CV) and constant current (CC) operation. For example, when a discharged lithium battery is initially charged, a switching power converter such as a flyback converter cannot maintain a constant voltage to such a load in that amount of current required would exceed an initial constant current limit. Charging of the discharged battery thus begins in a constant current mode (CCM) of operation at some maximum current limit (e.g. 4 A). But as the battery is gradually charged, the output voltage over the data cable driving the battery will slowly rise. Eventually, the battery voltage hits a maximum level, whereupon the switching power converter switches to a CCM mode of operation in which the output current limit is decreased. As the battery further charges, the output voltage will again eventually exceed its limit, whereupon the output current is again reduced. Eventually, the direct battery charging ends in a constant voltage mode (CVM) of operation while the output current continues to drop.

But conventional thermal de-rating processes are incompatible with CCM and CVM operation. For example, FIG. 1A illustrates a power adapter (TA) driving an output voltage V and an output current I over a USB cable to a load. The load operates in a constant resistance (CR) mode of operation. Should this power adapter operate in CVM while it thermally de-rates and drives this constant-resistance load, the resulting output voltage and output current waveforms are shown in FIG. 1B. Prior to hitting its thermal maximum, the power adapter maintains the output voltage at 12V with an output current (CC_Limit_1) of 2 A. Should the current exceed the CC limit, the power adapter enters a CC shutdown mode in which the output voltage and output current both drop to zero. In response to the power adapter's temperature exceeding a thermal limit, the power adapter thermally de-rates its constant current limit to 1.5 A (CC_Limit_2). The 6Ω resistance of the load then causes the output voltage to drop to 9V while the output current is kept constant at 1.5 A. Although the constant current limit is not exceeded such the power adapter would not shutdown, the drop of the output voltage from 12V to 9V may cause the load to trigger a fault condition. The load may also operate in constant current mode of operation such as at the 2 A limit shown in FIG. 1B. In that case, the load will continue to draw 2 A despite the change in the power adapter to the 1.5 A constant current limit. The 2 A draw by the load would then cause the power adapter to shutdown such that the output voltage and output current would drop to zero.

Accordingly, there is a need in the art for switching power converters having improved thermal de-rating modes of operation that avoid fault conditions in the load or thermal shutdown of the switching power converter.

SUMMARY

A switching power converter (power adapter) is disclosed that powers a mobile device through a data cable such as a USB cable. To avoid the conventional problems of fault conditions or shutdown that result from thermal de-rating, the switching power converter is configured to alert the mobile device that the thermal limit for the switching power converter has been exceeded. The mobile device may then command for a new constant current limit to be used by the switching power converter. Alternatively, the switching power converter may alert the mobile device of the new constant current limit. Regardless of how the new constant current limit is set, the mobile device adjusts its loading of the switching power converter so that the new constant current limit is not exceeded. Thus the output voltage is maintained at a desired level such that the mobile device does not trigger an under-voltage fault condition. Similarly, the switching power converter will not exceed it new output current limit such that thermal shutdown is avoided. The negotiation between the switching power converter and the mobile device may also set a new constant voltage limit such that a new constant-voltage/constant-current transition point is established as a result of the thermal alarm.

Figure 1A:
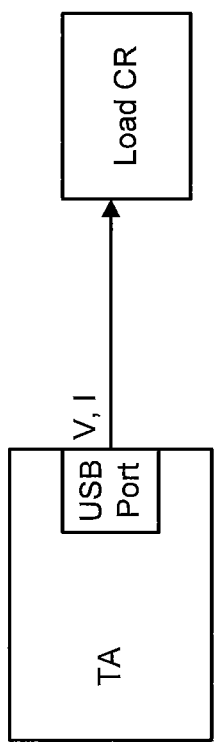
FIG. 1A is a diagram of a conventional power adapter driving a constant-resistance load.
Figure 1B:
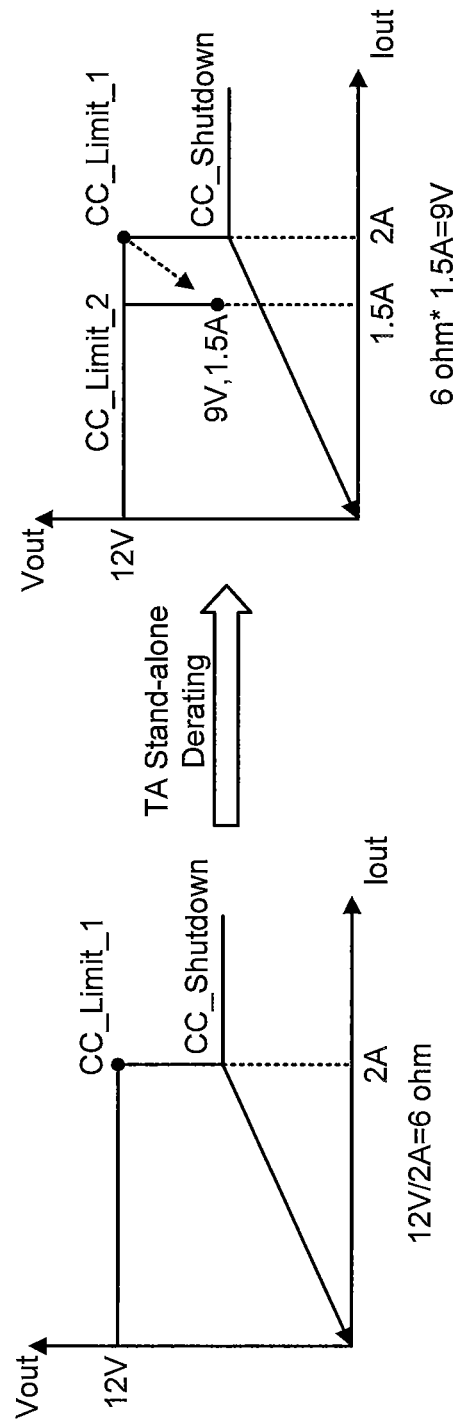
FIG. 1B illustrates the current and output voltage waveforms for the power adapter of FIG. 1A both before and after the thermal de-rating.

Embodiments of the present disclosure and their advantages are best understood by referring to the detailed description that follows. It should be appreciated that like reference numerals are used to identify like elements illustrated in one or more of the figures, where showings therein are for purposes of illustrating embodiments of the present disclosure and not for purposes of limiting the same.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

A switching power converter is disclosed that exploits the data channel in a data cable used to power a mobile device so as to alert the mobile device of a thermal overload in the switching power converter. Prior to the thermal alert, the switching power converter powered the mobile device over the data cable according to a first constant current limit. After alerting the mobile device, the switching power converter and the mobile device both operate according to a second constant current limit that is smaller than the first constant current limit. This second current limit may be set by either the mobile device or the switching power converter. But regardless of how the new current limit is set, the switching power converter may then power the mobile device safely according without causing an under-voltage alarm in the mobile device or forcing a shutdown of the switching power converter for violating the new current limit.

Figure 2:
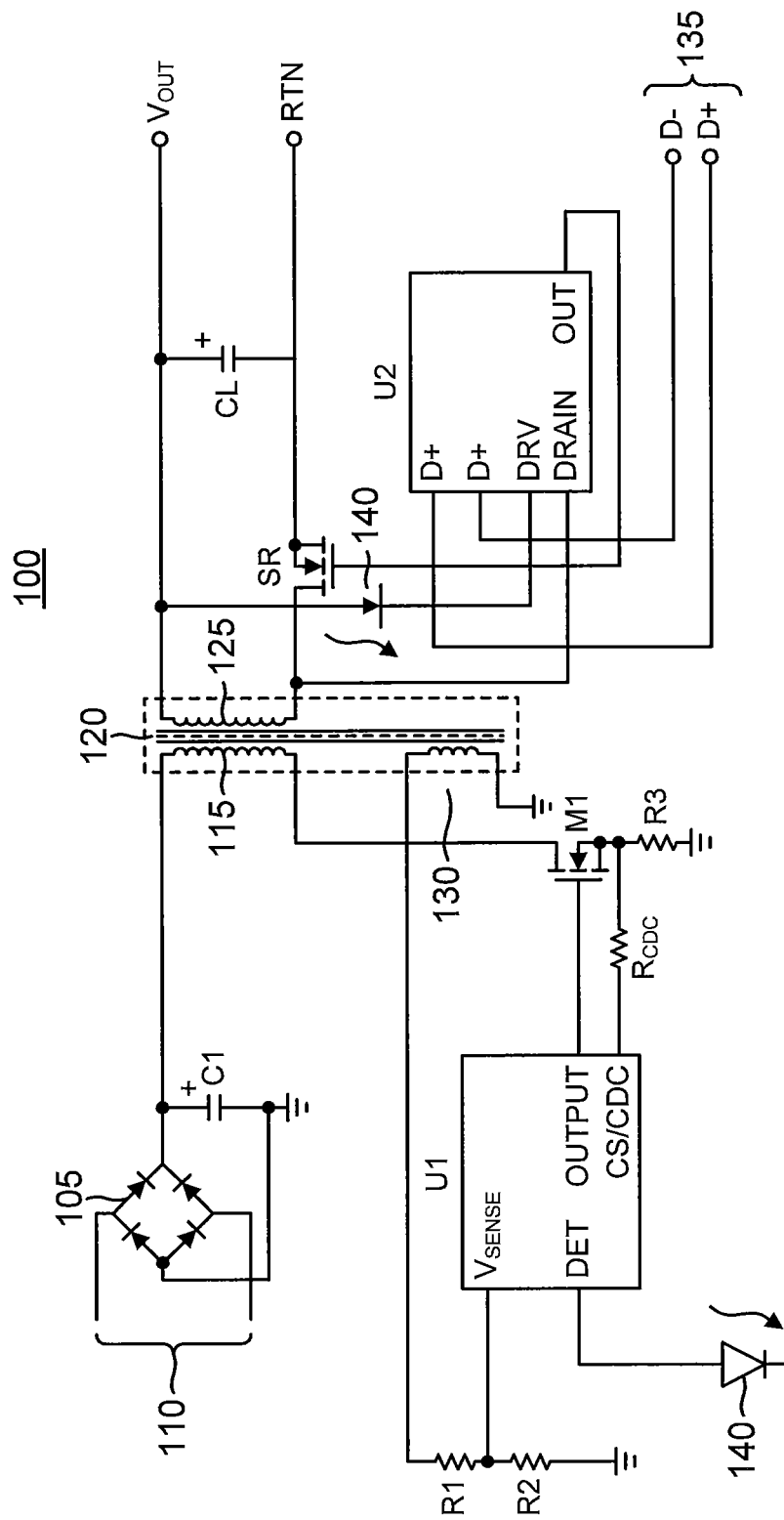
FIG. 2 is a diagram of an exemplary power converter and including a secondary-side controller, according to an embodiment.

The following example embodiment will be directed to the use of a USB cable but it will be appreciated that other data cables such as the Lightning cable are also suitable. An exemplary switching or multi-mode power converter 100 is shown in FIG. 2, which may be utilized to provide charging to a portable device, as discussed herein. A bridge rectifier 105 rectifies an AC input voltage from an AC mains 110 and outputs the resulting rectified input voltage into an input capacitor C1. This rectified input voltage also drives a magnetizing current into a primary winding 115 of a transformer 120 when a power switch such as an NMOS power switch transistor M is driven on by a primary-side controller U1. The primary-side controller U1 modulates the cycling of the power switch M1 to regulate an output voltage Vout produced at a secondary winding 125 of transformer 120. Since the primary-side controller U1 is isolated from a USB cable having a pair of a D+ and a D− data pins or terminals 135, a secondary-side controller U2 interfaces with the device being charged (not illustrated) through data pins 135. In power converter 100, secondary-side controller U2 controls the cycling of a synchronous rectifier (SR) switch transistor such as an NMOS transistor. The secondary-side controller U2 switches on the SR switch transistor in response to primary-side controller U1 switching off the power switch M1. The resulting synchronous rectification is conventional and improves efficiency over the use of a diode on the secondary side to perform analogous synchronous rectification.

An auxiliary winding 130 for transformer 120 couples to ground through a voltage divider formed by a serial pair of resistors R1 and R2 to produce a sense voltage $V_{SENSE}$ that is received by primary-side controller U1. For example, primary-side controller U1 may sample $V_{SENSE}$ at the transformer reset time to sense the output voltage. To modulate the output voltage in response to this sensing, primary-side controller U1 may adjust the frequency or pulse width for the cycling of power switch. For example, primary-side controller U1 may monitor the magnetizing current magnitude (CS) through a voltage divider formed by a resistor R3 and a cable drop compensation resistor ($R_{CDC}$) coupled to the source of power switch transistor M1. When the current magnitude CS reaches a desired level for a given power switching cycle, primary-side controller U1 may proceed to switch off power switch transistor M1.

Secondary-side controller U2 is configured to monitor the voltage on the D+ terminal in USB interface 135 to determine if a load such as a mobile device is attached to another end of the USB cable (not illustrated). In response to this detection, secondary-side controller U2 may enumerate the attached device, for example, to determine if the device supports a rapid-charge mode of operation in which the output voltage may be increased from a nominal level such as 5 V to a higher level such as 12V or 19V. Secondary-side controller U2 may then signal the enumeration data to primary-side controller U1 by grounding an optocoupler 140 coupled to an anode of a load capacitor CL. Load capacitor CL couples between the output voltage node and ground (RTN) of the USB cable to smooth the output voltage. Primary controller U detects the voltage change across optocoupler 140 as a detect voltage (DET) to decode the enumeration data.

To control the cycling of the SR FET, secondary-side controller U2 monitors its drain voltage (DRAIN). While the power switch M1 is conducting, the drain voltage for the SR FET will be grounded or near zero but will then swing high when the power switch M1 is cycled off. As known in the synchronous rectification arts, secondary-side controller U2 responds to this voltage change by driving the SR FET on through an OUT terminal. Due to the relatively-low on resistance of the SR FET, the resulting synchronous rectification saves power as compared to the use of a secondary-side diode. However, it will be appreciated that alternative embodiments for a flyback converter may instead rectify the secondary winding current through an output diode rather than include or use an SR FET.

Regardless of how the flyback converter rectifies its secondary winding current, it may either directly or indirectly charge the mobile device. In direct charging embodiments, the mobile device does not process the output voltage from the USB cable through its own switching power converter. The output voltage (and output current) from the USB cable thus directly charges the mobile device's battery in a direct-charge embodiment. In contrast, the mobile device may instead process the output voltage from the USB cable in its own switching power converter (for example, through a buck converter) to produce the output voltage and current that will charge its battery. The output voltage (and output current) from the USB cable thus only indirectly charges the mobile device's battery in such indirect-charge embodiments. An indirect-charge embodiment will be discussed first.

Figure 3A:
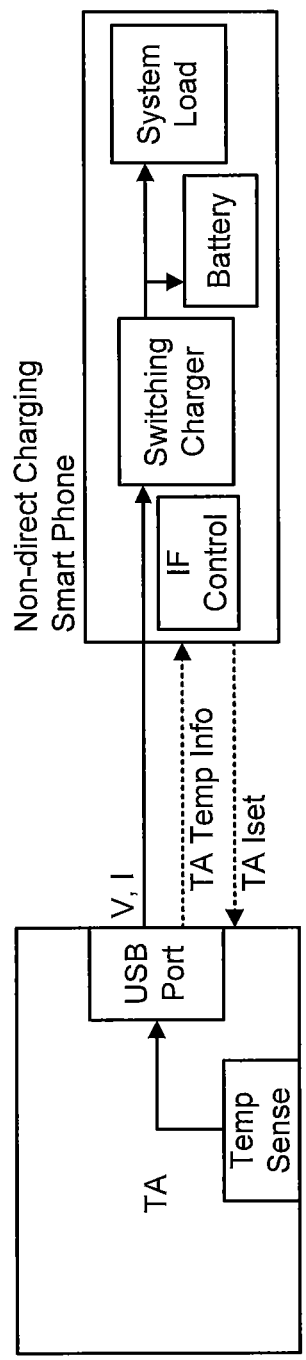
FIG. 3A is a block diagram of an indirect-charging system in accordance with an embodiment of the disclosure.

FIG. 3A illustrates the flyback converter as a TA having a temperate sensor (Temp Sense) for monitoring whether its temperature has risen too high in an over-temperature condition. The flyback converter's secondary-side controller U2 (shown in FIG. 2 discussed above) would then communicate the resulting temperature alarm to the non-direct charging smartphone or mobile device. A controller (IF Control) in the mobile device responds to the temperature alarm by commanding the flyback converter to operate according to a reduced constant-current limit through the command TA Iset. Alternatively, the flyback converter may instead select the new current limit and alert the mobile device controller of the new current limit. In light of the new current limit, the mobile device controller controls its switching power converter (Switching Charger) to adjust its operation accordingly as to continue to charge the battery. The controller in the mobile phone also adjusts the mobile phone load it presents (System Load) to the USB cable so that the mobile phone current draw from the flyback converter does not exceed the new current limit. For example, the mobile phone may adjust its processor (not illustrated) operation or may reduce the switching charger current so that the new current limit is not exceeded.

Figure 3B:
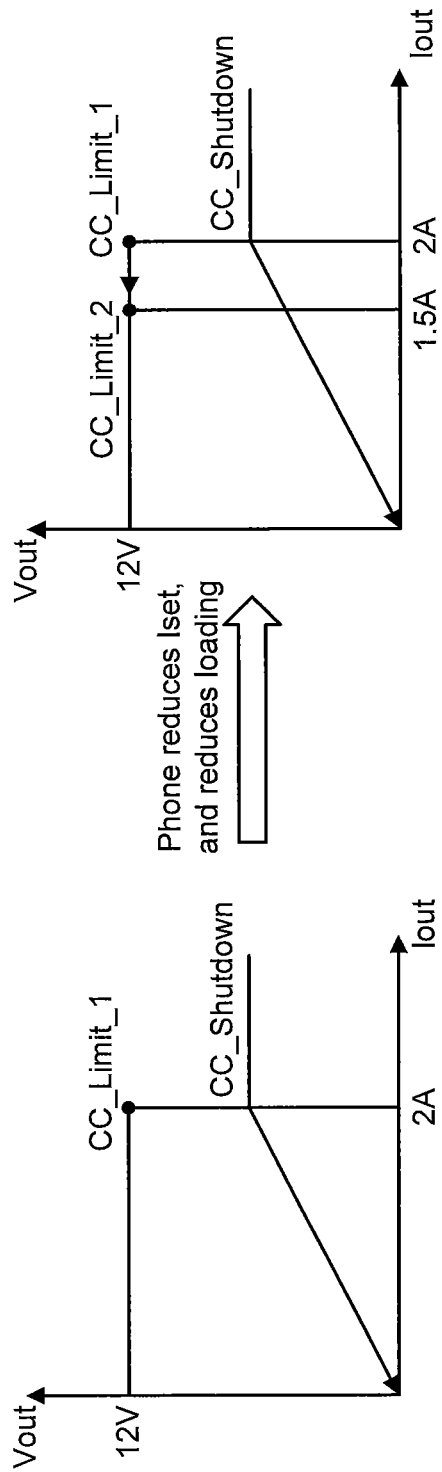
FIG. 3B illustrates the current and output voltage waveforms for the power adapter of FIG. 3A both before and after the thermal de-rating.

In this direct-charge embodiment, the constant voltage limit is not adjusted. The resulting output current and output voltage on the USB cable before and after the thermal alarm are shown in FIG. 3B. Prior to the thermal alarm, the constant current limit was 2 A whereas the constant voltage limit was 12V. Should the constant current limit (CC_Limit_1) of 2 A be exceeded, the power adapter will shut down as illustrated by the CC_Shutdown curve in which the output current and the output voltage are both decreased to zero. In response to the thermal alarm, the power converter can send the portable device directly the power converter temperature information, and the portable device can judge if the power converter temperature is within the normal range and if any adjustment is needed. The power converter and the portable device cooperate together and confirm that the power converter operating parameters will be adjusted in order to maintain a safe operating temperature of the TA. The portable device can send the power converter a new current setting command (Iset), and the power converter will change its CV/CC mode transition point based on the new Iset. In the meanwhile, the portable device itself reduces its loading to the power converter accordingly. After the thermal alarm, the new current limit (CC_Limit_2) is set to 1.5 A. But since the mobile device adjusts its operation so as to now draw more than the 1.5 A current limit, the output voltage stays at 12V such that no output voltage faults are triggered in the mobile device. Moreover, the power adapter does not enter the CC_Shutdown mode because the 1.5 A current limit is not violated.

Figure 4A:
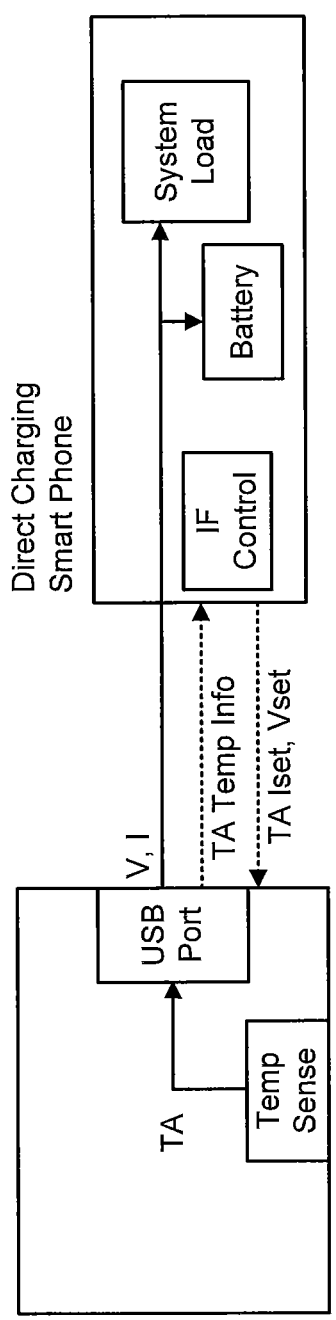
FIG. 4A is a block diagram of a direct-charging system in accordance with an embodiment of the disclosure.

A block diagram of a direct-charging system is illustrated in FIG. 4A. The power adapter includes a temperature sensor and USB interface as discussed with regard to FIG. 3A so that the controller U2 (FIG. 2) can report the temperature alarm to the controller in the mobile device. This reporting of the alarm may consist merely of a binary flag that is asserted to signal the alarm. Alternatively, the temperature itself may be communicated to the mobile device controller so that the alarm is raised by the mobile device instead. The output voltage V and output current I carried on the USB cable directly charge the battery in the mobile device. Responsive to the over-temperature condition, the mobile device controller (IF Control) commands the power adapter to operate according to a new current limit (TA Iset) as well as to a new voltage limit (Vset). Alternatively, the power adapter may select these new current and output voltage limits. Regardless of how the current and voltage limits are set, the mobile device adjusts its system load so that the new output current limit is not violated.

Figure 4B:
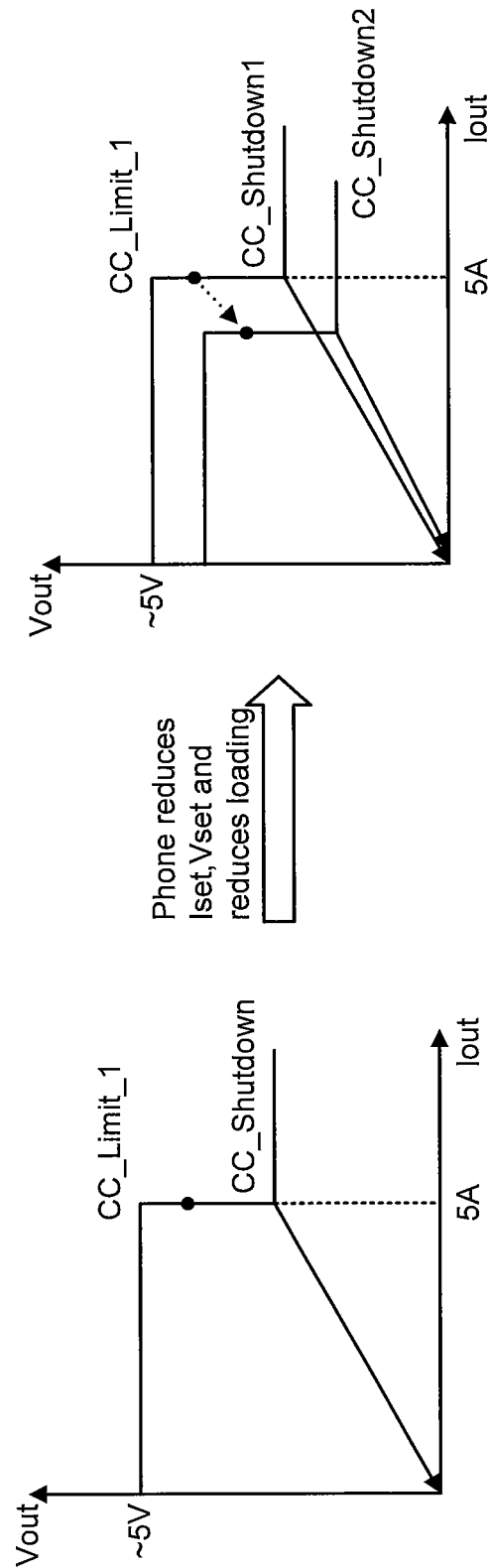
FIG. 4B illustrates the current and output voltage waveforms for the power adapter of FIG. 4A both before and after the thermal de-rating.

The resulting output voltage and output current limits are shown in FIG. 4B both prior to the over-temperature condition and after the over-temperature condition. Prior to the alarm, the constant voltage limit was 5V whereas the constant current limit (CC_Limit_1) was 5 A. After the alarm, both the constant voltage limit and the constant current limit are reduced. The resulting over-current condition is represented by the curve CC_Shutdown2. Since the mobile device adjusts its load, such a shutdown does not occur. Moreover, no under-voltage alarms are triggered at the mobile device. The power adapter then operates according to the new constant-voltage/constant-current transition point. If the load is such that the power adapter cannot drive the output voltage up to the new constant voltage limit, it operates in a constant current mode at the new constant current limit. But if the output voltage rises to the new output voltage limit, the power adapter begins to reduce the output current so that the power adapter functions in a constant voltage mode of operation at the new output voltage limit. The temperature sensor in either the direct or indirect charge mode may be a negative temperature coefficient (NTC) sensor. The NTC sensor may be located near, for example, the power converter case or USB ports. The resulting NTC voltage may be converted into a digital signal using the VDM PD protocol and sent to the portable device.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method, comprising:
   prior to a thermal alarm, modulating a switching of a power switch in a switching power converter such that an output current of the switching power converter conducted through a data cable into a mobile device does not exceed a first constant current limit, wherein modulating the power switch prior to the thermal alarm further comprises modulating the power switch such that an output voltage of the switching power converter conducted over the data cable into the mobile device does not exceed a first constant voltage limit;
   while modulating the switching of the power switch according to the first constant current limit, detecting the thermal alarm responsive to a temperature for the switching power converter exceeding a thermal limit;
   responsive to the thermal alarm, receiving at the switching power converter a second constant current limit over a data channel in the data cable from the mobile device, wherein the second constant current limit is less than the first constant current limit;
   responsive to the thermal alarm, receiving at the switching power converter a second constant voltage limit over the data channel in the data cable from the mobile device, wherein the second constant voltage limit is less than the first constant voltage limit; and
   after receiving the second constant current limit, modulating the switching of the power switch in the switching power converter such that the output current of the switching power converter conducted through the data cable into the mobile device does exceed the second constant current limit,
   wherein modulating the power switch subsequent to the thermal alarm further comprises modulating the power switch such that the output voltage conducted over the data cable does not exceed the second constant voltage limit.

2. The method of claim 1, further comprising:
   directly charging a battery in the mobile device over the data cable.

3. The method of claim 1, further comprising:
   indirectly charging a battery in the mobile device over the data cable.

4. The method of claim 1, further comprising:
   responsive to the thermal alarm, adjusting a load in the mobile device so that a current draw by the mobile device from the data cable does not exceed the second constant current limit.

5. The method of claim 1, wherein receiving at the switching power converter the second constant current limit comprises receiving the second constant current limit over a data channel in a USB cable.

6. A method, comprising:
   prior to a thermal alarm, modulating a switching of a power switch in a switching power converter such that an output current of the switching power converter conducted through a data cable into a mobile device does not exceed a first constant current limit, wherein modulating the power switch prior to the thermal alarm further comprises modulating the power switch such that an output voltage of the switching power converter conducted over the data cable into the mobile device does not exceed a first constant voltage limit;
   while modulating the switching of the power switch according to the first constant current limit, detecting the thermal alarm responsive to a temperature for the switching power converter exceeding a thermal limit;
   responsive to the thermal alarm, selecting at the switching power converter a second constant current limit, wherein the second constant current limit is less than the first constant current limit;
   transmitting the second constant current limit to the mobile device over a data channel in the data cable;
   responsive to the thermal alarm, selecting at the switching power converter a second constant voltage limit;
   transmitting the second constant voltage limit over the data channel in the data cable to the mobile device; and
   after the thermal alarm, modulating the switching of the power switch in the switching power converter such that the output current of the switching power converter conducted through the data cable into the mobile device does exceed the second constant current limit, wherein modulating the power switch subsequent to the thermal alarm further comprises modulating the power switch such that the output voltage conducted over the data cable does not exceed the second constant voltage limit.

7. The method of claim 6, further comprising:
   directly charging a battery in the mobile device over the data cable.

8. The method of claim 6, further comprising:
   indirectly charging a battery in the mobile device over the data cable.

9. The method of claim 6, further comprising:
   responsive to the thermal alarm, adjusting a load in the mobile device so that a current draw by the mobile device from the data cable does not exceed the second constant current limit.

10. The method of claim 6, wherein transmitting second constant current limit comprises transmitting the second constant current limit over a data channel in a USB cable.

11. A switching power converter controller comprising:
    a temperature sensor configured to detect an operating temperature of a switching power converter during operation of the switching power converter to charge a portable device;
    a communication port configured to exchange information with the portable device;
    and
    a processor configured to: determine that the operating temperature meets or exceeds a thermal de-rating threshold at a first constant voltage and constant current mode transition point during charging of the portable device, determine a second constant voltage and constant current mode transition point for charging of the portable device based on the operating temperature meeting or exceeding the thermal de-rating threshold, and adjust operation of the switching power converter during charging of the portable device based on the second constant voltage and constant current mode transition point.

12. The switching power converter controller of claim 1, wherein the communication port is configured to communicate with the portable device using a USB interface and USB connection with the portable device.

13. The switching power converter controller of claim 11, wherein the processor is configured to determine the second constant voltage and constant current mode transition point by:

a communication, to the portable device, that the operating temperature meets or exceeds the thermal de-rating threshold; and a receipt of the second constant voltage and constant current mode transition point from the portable device.

14. The switching power converter controller of claim 13, wherein the receipt, by the processor, of the second constant voltage and constant current mode transition point from the portable device comprises:

receiving a current setting command from the portable device for charging of the portable device and adjusting the first constant voltage and constant current mode transition point to the second constant voltage and constant current mode transition point based on the current setting command.

15. The switching power converter controller of claim 1, wherein the portable device is further configured to adjust charging settings of the portable device based on the current setting command to reduce system load on the switching power converter.

16. The switching power converter controller of claim 15, wherein the portable device is configured to reduce the system load on the switching power converter by one of a reduction of the switching power converter current or a reduction of the system load current.

17. The switching power converter controller of claim 11, wherein the switching power converter is capable of being operated at multiple constant voltage mode operating voltages.

18. The switching power converter controller of claim 11, wherein the portable device comprises a rechargeable power supply, and wherein the switching power converter is capable of being directly coupled to the rechargeable power supply for recharging the rechargeable power supply.

* * * * *